Dec. 7, 1926.
V. D. HUMPHREY
CENTERING ATTACHMENT FOR STEERING MECHANISMS
Filed August 24, 1926
1,610,057
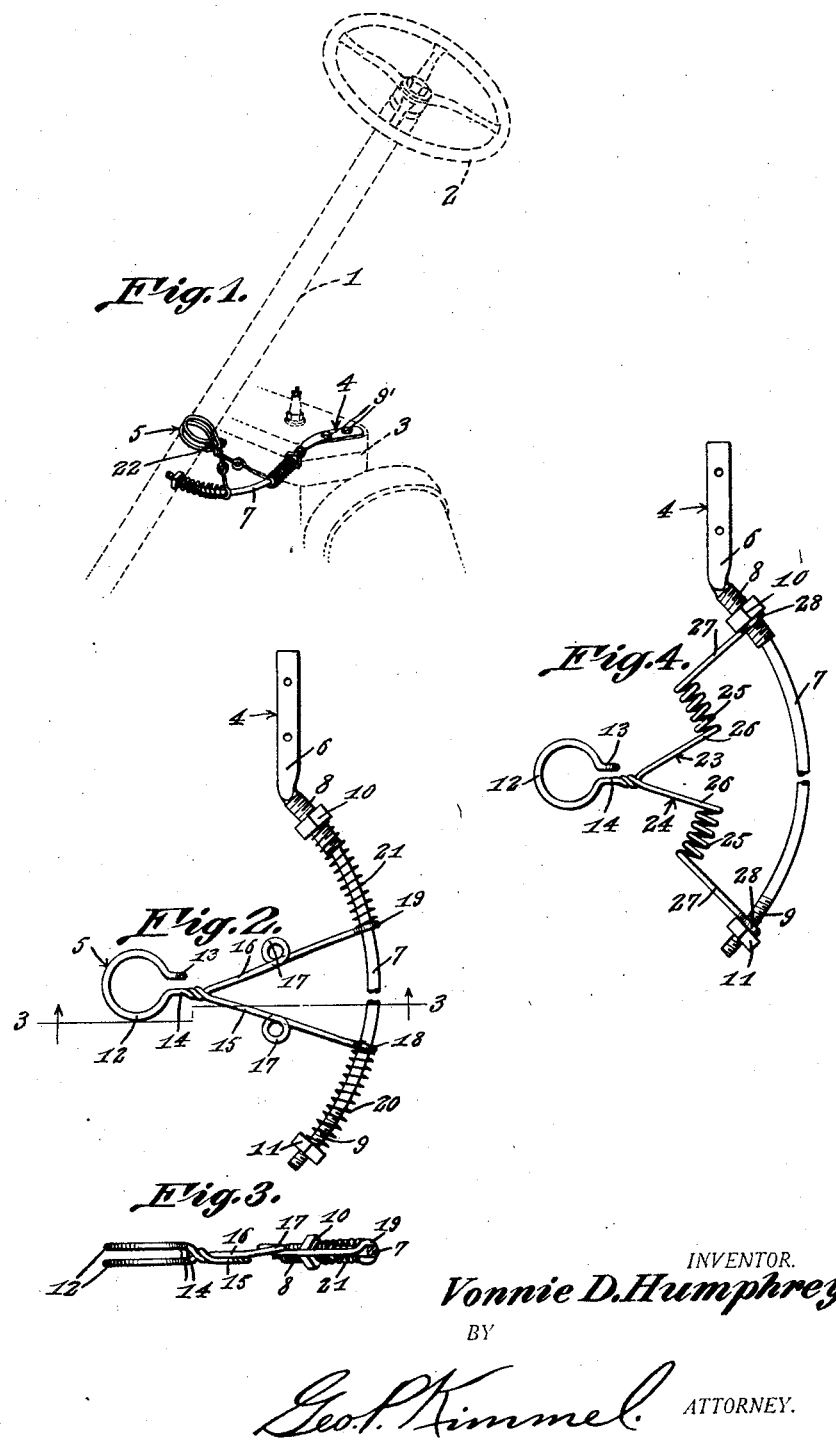
INVENTOR.
Vonnie D. Humphrey,
BY
Geo. P. Kimmel, ATTORNEY.

Patented Dec. 7, 1926.

1,610,057

UNITED STATES PATENT OFFICE.

VONNIE D. HUMPHREY, OF BISHOPVILLE, SOUTH CAROLINA.

CENTERING ATTACHMENT FOR STEERING MECHANISMS.

Application filed August 24, 1926. Serial No. 131,280.

This invention relates to a centering attachment for use in connection with the steering mechanism of motor vehicles, more particularly the steering shaft of such mechanisms, and has for its object to provide, in a manner as hereinafter set forth, an attachment of such class for automatically arresting the wabbling of the steering mechanism and equalizing the same during the travel of the vehicle thereby providing for the latter to move in a straight line of travel and overcome the necessity of constantly shifting the steering wheel, by the driver, to maintain a straight line of travel for the vehicle.

Further objects of the invention are to provide, in a manner as hereinafter set forth a centering attachment for the purpose referred to which is simple in its construction and arrangement, strong, durable, compact, thoroughly efficient in its use, readily installed with respect to the steering shaft of a steering mechanism, and inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which will fall within the scope of the claims hereunto appended.

In the drawings wherein like reference characters denote corresponding parts throughout the several views:

Figure 1 illustrates in dotted lines and in elevation a steering shaft and an engine block or head and showing the adaptation therewith in full lines of a centering attachment in accordance with this invention.

Figure 2 is a top plan view of the centering attachment in accordance with this invention.

Figure 3 is a section on line 3—3 Figure 2.

Figure 4 is a top plan view of a modified form of centering attachment in accordance with this invention.

Referring to the drawings in detail 1 denotes the steering shaft of a steering mechanism, 2 the steering wheel and 3 the motor or engine head.

A centering attachment, in accordance with this invention comprises a pair of coacting members, and one of which is fixed to the engine head 3 or other suitable portion of the vehicle and the other of which is clamped to the steering rod 1 so that it will be shifted therewith. The said members are indicated generally by the reference characters 4 and 5. The member 4 being fixedly secured with the engine head 3 of other suitable part of the vehicle and the member 5 being clamped to that portion of the steering shaft 1 which projects below the steering column.

The member 4 is termed a stationary support and in both forms illustrated said member 4 comprises a flat shank 6 having extended from its outer end a curved arm 7 of greater length than the length of the shank 6. The arm 7 is cylindrical in cross section and has its inner terminal portion 8 of greater diameter than the remaining part of said arm 7. The inner terminal portion 8 of the arm 7 is peripherally threaded. The outer terminal portion of the arm 7, which is indicated at 9 is peripherally threaded. The curvature of the arm 7 is such that the axis of the arc thereof will be the same as the axis of the steering rod 1. When the member 4 is fixedly secured in position, as shown by way of example, by the hold fast devices 9', to the engine head 3, the steering rod 1 is arranged in alinement with the transverse center of the arm 7. Adjustably mounted on the inner terminal portion 8 is a tensioning nut 10 and adjustably mounted on the threaded outer terminal portion 9 is a tensioning nut 11. The purpose for which the nuts 10 and 11 are intended will be presently referred to.

The member 5 includes a split clamping band 12 and one end thereof is free and angularly disposed as indicated at 13. The other end of the clamping band 12 is also angularly disposed, as indicated at 14 and with reference to Figure 2, said end terminates in a pair of resilient arms 15. 16 which are oppositely disposed with respect to each other and also extend at an inclination. The arm 15, as well as the arm 16, intermediate the ends thereof is bent upon itself to provide a spring loop 17. The outer end of the arm 15 is formed with a loop 18 slidably mounted on the arm 7 and the outer end of the arm 16 is provided with a loop 19 which is slidably mounted on the arm 7.

Mounted on the arm 7, is a pair of controlling springs 20, 21 for the arms 15, 16 respectively. The spring 20 is interposed between the loop 18 and nut 11 and the spring 21 is interposed between the loop 19 and the nut 10. The nuts 10 and 11 are provided for increasing or decreasing the tension of the springs 20, 21 respectively. A hold fast device 22 is provided for connecting the split ends of the clamping band 12 together whereby said band will be clamped to the steering shaft 1 so that the member 5 will tend to pivot with the shaft, but will be resisted by the springs 17 and 21, which will tend to rerotate the shaft to its original position.

In the form shown in Figure 4, the end 14 of the clamping band terminates in a pair of oppositely disposed inclined arms referred to generally by the reference characters 23, 24 and each of said arms is provided intermediate its ends with a coiled spring 25 of arcuate form and which has the axis thereof the same as the axis of the steering rod 1. The arm 23, as well as the arm 25 includes an inner portion 26 and an outer portion 27. The outer portion 27 is upon a greater inclination than the inner portion 26. The inner portion 26 terminates in the inner end of the spring 25 and the outer portion 27 has its inner end terminate in the outer end of the spring 25. The outer end of each portion 27 is formed with a loop 28. The loop formed at the outer end of the arm 23 is slidably mounted on the terminal portion 8 of the arm 7 and abuts against the tensioning nut and the loop 28 at the outer end of the arm 24 is mounted on the threaded outer terminal portion 9 of the arm 7 and abuts against the tensioning nut 11. In the forms shown in Figures 2 and 4 the nuts 10 and 11 are provided for increasing or decreasing the tension of the springs 25 or the arms 23 and 24 respectively.

The springs 20, 21 and 25 provide equalizing means and this statement also applies to the arms 15, 16, 23 and 24. The member 4 acts as a support for the member 5 and said members coact in a manner to automatically arrest the wabbling of the steering mechanism during the travel of the vehicle, thereby providing for the latter to move in a straight line of travel and overcomes the necessity of constantly shifting the steering wheel, by the driver, to maintain a straight line of travel for the vehicle. The steering shaft will be held in position to provide for a straight line travel, even though the driver's hands are entirely free of the wheel.

It is thought that the many advantages of a centering attachment, for use in connection with steering mechanisms of motor vehicles, and in accordance with this invention, can be readily understood, and although the preferred embodiment of the invention is as illustrated and described, yet it is to be understood that changes in the details of construction can be had which will fall within the scope of the invention as claimed.

What I claim is:

1. A centering attachment for the steering mechanisms of motor vehicles comprising a support adapted to be fixedly secured with the vehicle and including an arm of arcuate curvature, and a resilient element adapted to be fixed at one end to the steering shaft of said mechanism and bodily carried therewith, said element including a pair of inclined arms, and said element and support having coacting means for automatically arresting the wabbling of the steering mechanisms to center the same during the travel of the vehicle.

2. A centering attachment for the steering mechanisms of motor vehicles comprising a resilient element adapted to have one end fixed with the steering rod of said mechanism whereby said element will be bodily carried with said shaft, said element including a pair of resilient arms inclining in opposite directions, a support including an arcuate arm, the arms of said elements slidably mounted on the arm of said support, said support adapted to be fixed with the vehicle and have its arm oppose the steering shaft of said mechanism, and means mounted on the arm of said support for maintaining the arms of said element thereon.

In testimony whereof, I affix my signature hereto.

VONNIE D. HUMPHREY.